US011838681B2

(12) United States Patent
Hampton O'Neil

(10) Patent No.: US 11,838,681 B2
(45) Date of Patent: Dec. 5, 2023

(54) ELECTRONIC IMAGER

(71) Applicant: DIGIFILM CORPORATION, Paris (FR)

(72) Inventor: Howard Robert Hampton O'Neil, Paris (FR)

(73) Assignee: DIGIFILM CORPORATION, Paris (FR)

( * ) Notice: Subject to any disclaimer, the term of this patent is extended or adjusted under 35 U.S.C. 154(b) by 254 days.

(21) Appl. No.: 17/290,678

(22) PCT Filed: Nov. 2, 2018

(86) PCT No.: PCT/EP2018/079994
§ 371 (c)(1),
(2) Date: Jun. 29, 2021

(87) PCT Pub. No.: WO2019/091865
PCT Pub. Date: May 16, 2019

(65) Prior Publication Data
US 2022/0014707 A1    Jan. 13, 2022

(51) Int. Cl.
| G03B 21/00 | (2006.01) |
| G03B 27/32 | (2006.01) |
| H04N 5/74 | (2006.01) |
| G03B 21/14 | (2006.01) |

(52) U.S. Cl.
CPC ......... *H04N 5/7458* (2013.01); *G03B 21/008* (2013.01); *G03B 21/14* (2013.01)

(58) Field of Classification Search
CPC ...... G03B 21/008; G03B 21/14; G03B 27/32; G03B 27/00
See application file for complete search history.

(56) References Cited

U.S. PATENT DOCUMENTS

| 2003/0142619 | A1 | 7/2003 | Mussig et al. |
| 2005/0219470 | A1 | 10/2005 | Hsieh et al. |
| 2009/0033885 | A1* | 2/2009 | Shirai ............... G02B 26/0841 |
| | | | 353/121 |
| 2009/0262312 | A1* | 10/2009 | Ho ....................... G03B 21/208 |
| | | | 359/291 |
| 2010/0177291 | A1* | 7/2010 | Yoon ................... G03B 27/521 |
| | | | 355/67 |
| 2017/0200410 | A1* | 7/2017 | Li ............................ G09G 3/32 |

FOREIGN PATENT DOCUMENTS

| FR | 2 985 838 A1 | 7/2019 |
| JP | 2005-043770 A | 2/2005 |
| JP | 2008-250193 A | 10/2008 |

OTHER PUBLICATIONS

International Search Report received from the European Patent Office in Application No. PCT/EP2018/079994 dated Jan. 2, 2019.
International Preliminary Report on Patentability received in Application No. PCT/EP2018/079994 dated May 8, 2018.

\* cited by examiner

*Primary Examiner* — Ryan D Howard
(74) *Attorney, Agent, or Firm* — THE MARBURY LAW GROUP, PLLC

(57) ABSTRACT

An electronic imager (1) for imaging a photographic medium, comprising at least one array (6) of micromirrors (2), each of which is suitable for reflecting, during a change in position, a light beam coming from at least one light source (3) towards a projecting optical element (4), the change in position of the micromirrors (2) being controlled by a signal modulated at a toggling frequency (fb) of the micromirrors comprised between 1 Hz and 100 kHz.

16 Claims, 2 Drawing Sheets

ELECTRONIC IMAGER

CROSS REFERENCE TO RELATED APPLICATIONS

Figure 1:
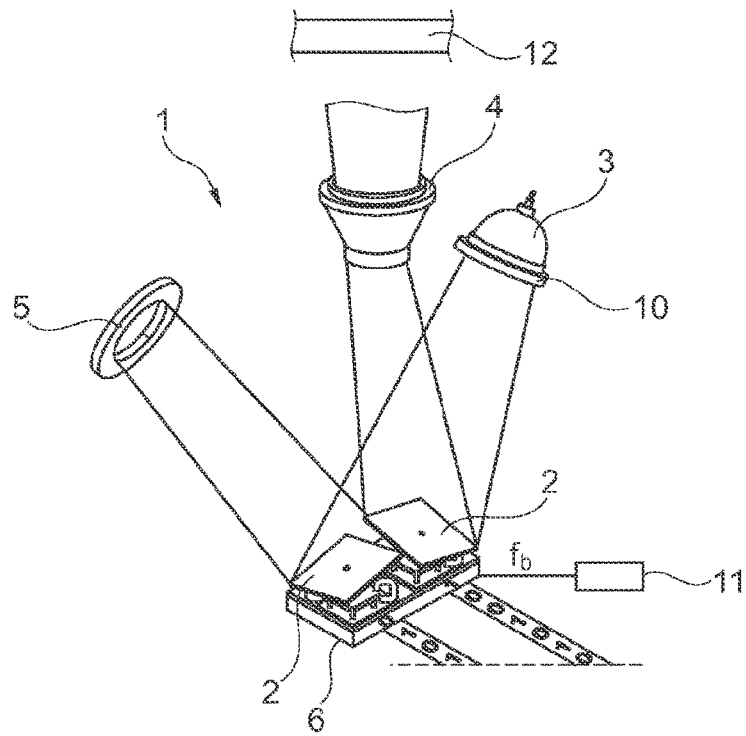

This application in a National Phase Application of International Application No. PCT/EP2018/079994 filed Nov. 2, 2018, which is incorporated by reference herein in its entirety.

The present invention relates to electronic imagers and their use, especially to save digital data on a strip-shaped photographic medium.

Digital content, and especially cinematographical digital content, but also digital content resulting from surveillance or medical imaging, is undergoing rapid growth, and durably archiving such content while preserving its quality is something that is crucial, as described in patent FR 2 985 838.

To be durably archived the data must be preserved in a way that is faithful to their original content and form, and they must be recoverable in digital format far into the future, i.e. in one or more decades' or even one or more centuries' time. The means for recovering the data must not only allow display on a screen, printing on paper, or data to be rendered in another way, but also the source digital data to be recovered.

It is known to save digital data on a photographic medium, by imaging them, i.e. by reproducing the data on the medium in the form of pixels making up images.

These media may degrade over time, depending on the conditions under which they are preserved. Furthermore, the inherent movement of the medium while the data are being recorded and read may be a source of error.

Such data are most often recorded using an electronic imager, which is preferably a digital light projector (DLP).

An imager is composed of one or more (in general three) matrix arrays of micro-mirrors (such matrix arrays of micro-mirrors are more commonly referred to as digital micro-mirror devices or DMDs).

As known per se, an electronic imager comprises at least one matrix array of micro-mirrors. Patent application US 2005/0219470 discloses an imager using at least two matrix arrays with various resolutions that are able to be modified via a change in frequency.

A matrix array of micro-mirrors operates by making change state all the mirrors, i.e. all the pixels, which are systematically brought to a zero state then to a new state. Each instruction to switch the mirrors involves two changes of state, or transitions, which are applied to all of the mirrors: a first reset to zero then a transition to the required level. In general, the change in position of the micro-mirrors is commanded via a signal modulated by pulse-width modulation (PWM). The micro-mirrors change position at a reference switching frequency, which is implemented by the manufacturer of the imager in a controller thereof. This reference frequency is for example about 150 kHz, this allowing 65 000 levels to be described per color component.

The higher the number of times that a micro-mirror is in the on state in a given period, the higher the reproduced brightness level (because the energy transmitted per unit time during the projection onto the lens is greater). Vibrations related to these multiple changes in state when excessive may create luminous noise that will decrease precision by producing, between the pixels, streaks of light due to diverted rays, these streaks being imperceptible on the medium but a hindrance during data recovery.

In the case of a precise identification of programmed light levels among a predefined number of levels, it is important on the one hand to identify with precision the various mirror-programmed levels, and on the other hand to preserve a dark level, corresponding to a permanently off state, that is sufficiently clear, i.e. free from needless noise. Specifically, to be able to distinguish with precision between the levels programmed in the light to be imaged on the medium it is important to consider this second constraint, the dark level that it is possible to achieve being of critical importance to the quality of the definition of the other levels.

Figure 2:
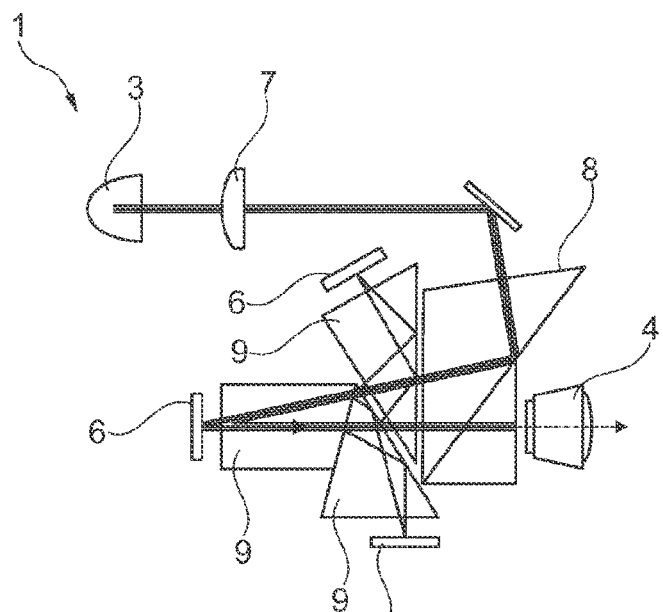

FIG. 2 schematically illustrates an electronic imager 1 equipped with three matrix arrays 6 of micro-mirrors, each processing one component of red, green or blue color. The light is projected by a lamp 3 through a condenser 7 and reaches a total-internal-reflection (TIR) prism 8 that directs the light toward the various matrix arrays 6. Before reaching the DMD matrix arrays, the light passes through three prisms 9 that allow the components of red, green or blue color to be split, so that there is only one component per matrix array, then the light returned by each matrix array is combined with the light returned by the others and lastly passed to a projecting lens 4.

Thus, as known, to record data, the three DMDs of a DLP are used to image the data in each of the superposed planes of the medium, which represent red, green and blue levels, respectively, the color component of each pixel having a value in the associated plane. However, this makes it difficult to obtain the same image in the three planes. To remedy this, it is possible to increase the depth of field of the imager, but this leads to problems with nonuniformity in the illumination.

There is therefore a need to improve electronic imagers, especially for the purpose of saving digital data on a photographic medium, in order to decrease luminous noise during the recording of the data.

The aim of the invention is to respond to this need and it does so, according to one of its aspects, by virtue of an electronic imager for imaging a photographic medium, comprising at least one matrix array of micro-mirrors each of which is suitable for reflecting, during a change in position, a light beam originating from at least one light source toward a projecting optical element, the change in position of the micro-mirrors being commanded by a signal modulated at a switching frequency of the micro-mirrors that is comprised between 1 Hz and 100 kHz.

By "imaging", what must be understood is the action of reproducing, on a photographic medium, digital data in the form of pixels making up images.

By virtue of this range of possible values for the switching frequency, which values are lower than the known reference frequency, the number of changes in position of the micro-mirrors is decreased, the luminous noise generated by the changes in position of the micro-mirrors is thus limited, and the precision with which data is recorded on the photographic medium is thereby improved.

By virtue of the decrease in the switching frequency, only 32 or 128, or even 8 or 16 different light levels may be reached, instead of the 65 000 levels that are possible with electronic imagers according to the prior art. Specifically, in the latter case, since light is constantly present, the photographic medium bears witness to each and every event, including off states in which however nothing is intended to be transmitted, by scattering, refraction or diffraction, to the medium. The invention allows the dark value corresponding to a permanently off state to be better emphasized by limiting, as much as possible, the residual brightness associated with the dark value. Off states are thus minimized as much as possible by decreasing the switching frequency.

The invention thus provides a solution allowing digital data to be durably recorded on a photographic medium.

For example, working with 16 grayscale levels, in a given period the micro-mirrors are switched only 16 times per image, instead of about six thousand times per image, i.e. 150 000 times per second at 24 images per second, as in known imagers, i.e. about 400 times less.

Preferably, the switching frequency of the micro-mirrors is lower than 50 kHz, better still than 10 kHz, and even better still than 5 kHz.

Preferably, the switching frequency $f_b$ of the micro-mirrors is lower than or equal to 1 kHz. The modulation of the signal that controls the micro-mirrors is thus very low frequency. The mirrors may thus switch once and remain in this position for a duration at least equal to $2 \times 1/f_b$ seconds.

The choice of the switching frequency $f_b$ may obey a control law taking as parameters the number $N_i$ of images per second and the number $N_g$ of grayscale levels desired to be imaged on the medium, and preferably: $f_b = 2 \times N_g \times N_i$. The number of images per second depends, as known, on the sensitivity of the medium, on the amount of light projected, and on the speed of the physical camera.

A controller of the electronic imager, which drives the change in position of the micro-mirrors, may be configured to take as input the number $N_i$ of images per second and the number $N_g$ of desired grayscale levels and to compute the switching frequency $f_b$.

As a variant, the predefined possible values of the switching frequency may be stored in the controller of the electronic imager.

In this case, the electronic imager may comprise a selector for selecting the switching frequency of the micro-mirrors from at least two predefined values, and better still from at least five predefined values. This allows the switching frequency of the micro-mirrors to be suitably chosen depending on the targeted application. The selector may be a button or a digital screen allowing a frequency value to be selected.

The modulated signal may originate from an additional circuit that synthesizes at least one switching frequency of the micro-mirrors, the additional circuit replacing a controller of the imager that commands the change in position of the micro-mirrors at a reference frequency, the output of the additional circuit being connected to the input that commands the change in position of the micro-mirrors.

In known imagers, the reference frequency is typically higher than 100 kHz, and especially close to 150 kHz.

The additional circuit may be configured to take as input the number $N_i$ of images per second and the number $N_g$ of desired grayscale levels and to compute the switching frequency $f_b$.

As a variant, the additional circuit is suitable for receiving an instruction as to the choice of a value of the switching frequency from a plurality of predefined values, and for example at least two, or even at least five predefined values.

The electronic imager is preferably configured to block and/or turn off at least one portion of the light beam originating from said at least one light source at least during one portion of the duration of the change in position of the micro-mirrors.

The light may be blocked or turned off throughout the duration of the change in position of the micro-mirrors.

The light may be blocked or turned off for between 2 and 110 nanoseconds.

The light may be blocked or turned off with a certain advance and/or a certain delay with respect to the change in position of the micro-mirrors.

The electronic imager may comprise at least one electronic shutter arranged to block, when activated, at least one portion of the light beam.

The presence of said at least one shutter thus filters parasitic light and prevents a transfer of undesirable noise, the micro-mirrors remaining stable in the presence of light and moving only in the dark. Said at least one shutter is advantageously synchronized with the micro-mirrors. The low switching frequency of the micro-mirrors makes it possible to make operate more easily such a shutter, which may follow the rhythm of switching of the mirrors, this being more difficult in the case of a very high reference switching frequency.

Preferably, said at least one shutter is an electro-optical and especially electro-chromic shutter comprising a Kerr or Pockels cell. Said at least one shutter is advantageously positioned between the light source and the matrix array of micro-mirrors.

The electronic imager may comprise an element for controlling said at least one light source, said element being configured to turn off this source at least during one portion of the duration of the change in position of the micro-mirrors. The controlling element may be commanded by a signal that originates from the controller or from the additional circuit and that transmits an instruction to turn off the source.

The presence of a controlling element or of a shutter allows the oscillating movement of the micro-mirrors to be synchronized with an absence of the light projected onto the latter during their movement. The controlling element and/or the shutter are advantageously configured in such a way that each time window of change in the position of the micro-mirrors is included in an at least equal time window during which the projected light is turned off or blocked.

Preferably, the electronic imager comprises a single matrix array of micro-mirrors and three light sources.

The electronic imager may comprise a single shutter for the three light sources. As a variant, the electronic imager comprises three shutters, each then being located between one of the three sources and the matrix array of micro-mirrors.

Yet another subject of the invention is an assembly comprising a photographic medium and an electronic imager according to the invention, i.e. an imager such as defined above.

Another subject of the invention, according to another of its aspects, is a method for reproducing images on a photographic medium, especially a strip-shaped photographic medium, and preferably a strip of 35 mm film, with a view to saving digital data resulting from image conversion, the method using an electronic imager according to the invention, i.e. an imager such as defined above, to project an image onto said medium.

The photographic medium comprising three superposed planes corresponding to red, green and blue levels, respectively, a single matrix array of micro-mirrors and three light sources, with one source for each respective plane of the medium, may be used.

Preferably, the source corresponding to the plane of the desired color component is selected to illuminate the micro-mirrors of the matrix array during their change in position.

The element for controlling the sources may be used to turn off the two sources that are not selected.

According to yet another of its aspects, another subject of the invention is a method for using an electronic imager comprising at least one matrix array of micro-mirrors each of which is suitable for reflecting, during a change in position, a light beam originating from at least one light source toward a projecting optical element, the method comprising blocking at least one portion of the light beam originating from said at least one light source and/or turning off the latter, at least during one portion of the duration of the change in position of the micro-mirrors.

The at least one portion of the light beam is advantageously blocked by an electronic shutter.

Another subject of the invention, according to another of its aspects, is a method for modifying an electronic imager comprising at least one matrix array of micro-mirrors each of which is suitable for reflecting, during a change in position, a light beam originating from at least one light source toward a projecting optical element, the method comprising:

reprogramming a controller of the imager that commands the change in position of the micro-mirrors at a reference frequency with a view to decreasing this frequency; or replacing a controller of the imager that commands the change in position of the micro-mirrors at a reference frequency with an additional circuit that synthesizes at least one possible value of the switching frequency of the micro-mirrors, which value is comprised between 1 Hz and 100 kHz, the output of the additional circuit being connected to the input that commands the change in position of the micro-mirrors.

Another subject of the invention, according to another of its aspects, is an electronic imager comprising at least one matrix array of micro-mirrors each of which is suitable for reflecting, during a change in position, a light beam originating from at least one light source toward a projecting optical element, the imager furthermore comprising at least one blocking or controlling element arranged to block at least one portion of the light beam originating from said at least one light source and/or to turn the latter off, at least during one portion of the duration of the change in position of the micro-mirrors.

The blocking element may be an electronic shutter arranged to block, when activated, at least one portion of the light beam originating from said at least one light source, at least during one portion of the duration of the change in position of the micro-mirrors.

As a variant, an element for controlling said at least one light source is configured to turn this source off at least during one portion of the duration of the change in position of the micro-mirrors.

The electronic imager may comprise an electronic shutter and a controlling element such as defined above.

Figure 3:
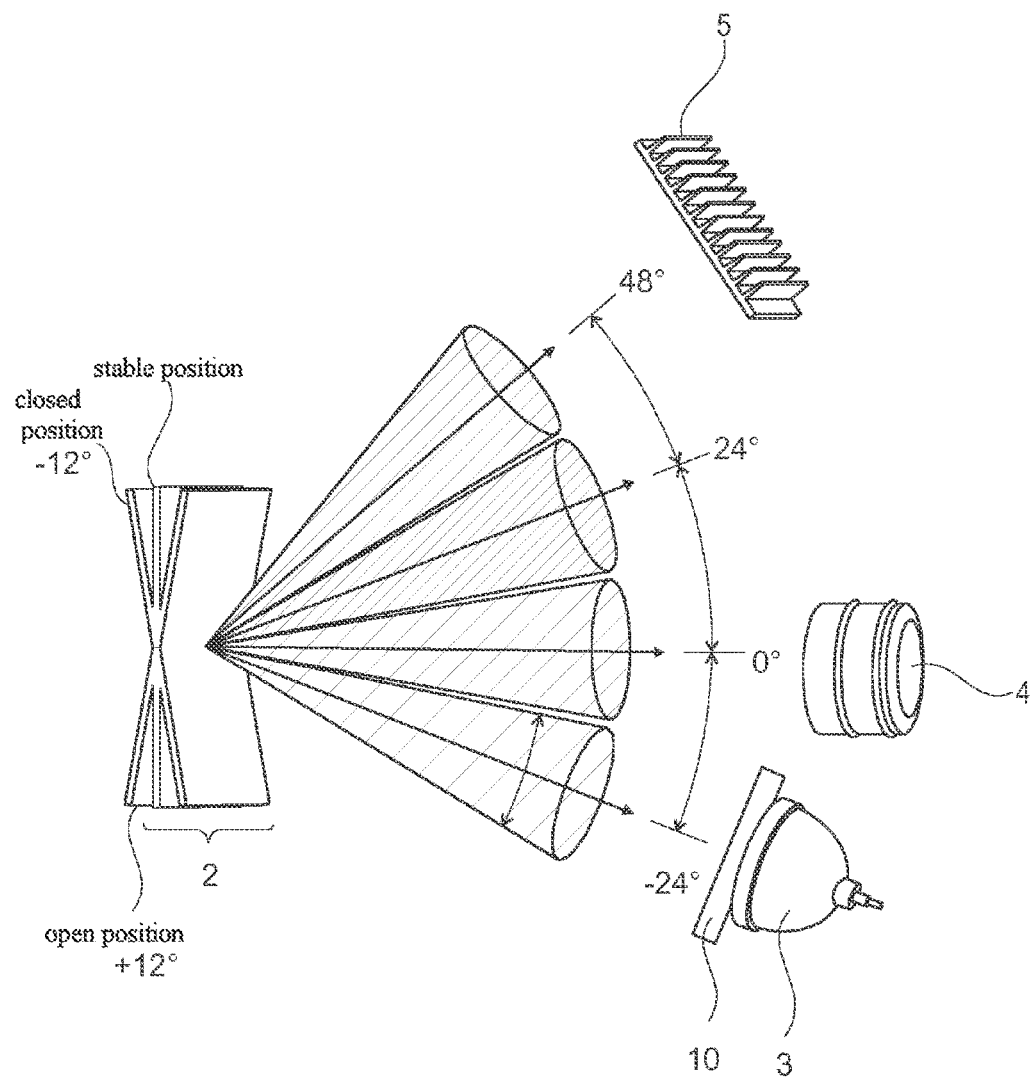

The invention will possibly be better understood on reading the following detailed description of nonlimiting examples of implementation thereof, and on examining the appended drawings, in which:

FIG. 1 shows an electronic imager according to the invention,

FIG. 2, which was described above, schematically shows an electronic imager according to the prior art comprising three matrix arrays of micro-mirrors, and FIG. 3 illustrates the operating principle of the modified imager according to the invention.

FIG. 1 shows an electronic imager 1 that projects onto a medium 12 and that comprises a matrix array 6 of micromirrors 2. A light source 3 illuminates these micro-mirrors 2, which reflect, depending on their position, the light beam either toward a projecting optical element 4, a lens for example, or toward an absorbent element 5.

The position of the micro-mirrors may correspond to an on state, in which the micro-mirrors are directed toward the light source 3, or to an off state, in which the micro-mirrors are turned away from the light beam. These on and off states relate to the logic levels 1 and 0 of the pixel, respectively.

The projecting optical element 4 projects onto the medium 12 at least one portion of the reflected light beam when the micro-mirrors 2 are in the on state.

The absorbent element 5 absorbs at least one portion of the light beam reflected in the off state of the micro-mirrors 2. This absorbent element is for example a black velvet cloth when the light sources are LEDs, this type of absorbent element being sufficient to absorb the surplus of energy distributed by the mirrors. The absorbent element may be a radiator in the case of a very hot light source, a mercury lamp for example.

As illustrated in FIG. 3, the micro-mirrors 2 rock plus or minus 12° with respect to a stable position corresponding to a flat state. The micro-mirrors 2 reflect the incident light at 24° toward the projecting lens 4 when they are in the on state, and at 72° toward the absorbent element 5 when they are in the off state.

The imager 1 comprises a controller that drives the change in position of the micro-mirrors 2. As described above, the change in position of the micro-mirrors 2 is commanded by a signal that is modulated at a switching frequency $f_b$ of the micro-mirrors that is comprised between 1 kHz and 100 kHz, and that is especially lower than 1 kHz. For example, to record at 24 images per second and with 16 grayscale levels, the switching frequency $f_b$ of the micro-mirrors is set to 768 Hz.

In a first embodiment of the invention, the predefined possible values of the switching frequency $f_b$ are stored in a controller of the electronic imager 1, said controller driving the change in position of the micro-mirrors 2 and having been reprogrammed accordingly. The electronic imager comprises, in this case, advantageously, a selector for selecting the switching frequency $f_b$ of the micro-mirrors 2 from at least two predefined values, and better still at least five predefined values.

In one variant, as shown in FIG. 1, the modulated signal originates from an additional circuit 11 that synthesizes predefined values of the switching frequency $f_b$ of the micro-mirrors 2, this additional circuit 11 replacing the controller, the output of the additional circuit 11 being connected to the input that commands the change in position of the micro-mirrors. Preferably, the additional circuit 11 is suitable for receiving an instruction as to the choice of a value of the switching frequency $f_b$ from a plurality of predefined values.

Preferably, and as shown in FIG. 3, an electronic shutter 10, for example of electro-optical type, is placed in front of the light source 3. This shutter 10 is configured to block, when activated, at least one portion of the light beam, during at least one portion of the duration of the switch of the micro-mirrors 2, or even throughout the duration of the change in position of the micro-mirrors 2.

The electronic imager 1 may comprise an element (not illustrated) for controlling the light sources, which element is configured to turn off one or other of the sources at least during one portion of the duration of the change in position of the micro-mirrors 2, or even throughout the duration of the change in position of the micro-mirrors 2.

The light may be blocked or turned off with a certain advance and/or a certain delay with respect to the change in position of the micro-mirrors 2.

Preferably, the electronic imager 1 according to the invention comprises only a single matrix array 6 of micro-mirrors 2. Three light sources 3 are advantageously used, one for each of the red, green and blue color levels corresponding to the three superposed planes of the medium 12. For the sake of clarity, a single light source 3 has been shown in FIG. 1. In this case, and contrary to the prior art, there is no need for any prism to be interposed between the light sources 3 and the matrix array 6 of micro-mirrors 2.

It is particularly advantageous to use the electronic imager 1 according to the invention to reproduce images on a photographic medium 12, especially a strip-shaped photographic medium, and preferably a strip of 35 mm film, with a view to saving digital data resulting from image conversion.

During the change in position of the micro-mirrors 2, the source corresponding to the plane of the component of desired color is selected. The light beams of the two other sources may be blocked by the shutter 10 placed in front of each thereof, or the sources may be turned off by a controlling element.

The invention is not limited to the examples that have just been described. The electronic imager 1 may comprise a different arrangement of matrix arrays of micro-mirrors, of light sources and of shutters and/or elements for controlling the sources.

The invention claimed is:

1. An electronic imager for imaging a photographic medium, comprising at least one matrix array of micro-mirrors each of which is suitable for reflecting, during a change in position, a light beam originating from at least one light source toward a projecting optical element, the change in position of the micro-mirrors commanded by a signal modulated at a switching frequency of the micro-mirrors that is lower than or equal to 1 kHz.

2. The electronic imager of claim 1, comprising a selector for selecting the switching frequency of the micro-mirrors from at least two predefined values.

3. The electronic imager of claim 1, wherein the modulated signal originates from an additional circuit that synthesizes at least one switching frequency of the micro-mirrors, the additional circuit replacing a controller of an imager that commands the change in position of the micro-mirrors at a reference frequency, an output of the additional circuit connected to an input that commands the change in position of the micro-mirrors.

4. The electronic imager of claim 3, wherein the additional circuit is suitable for receiving an instruction as to the choice of a value of the switching frequency from a plurality of predefined values.

5. The electronic imager of claim 1, configured to block and/or turn off at least one portion of the light beam originating from the at least one light source at least during a portion of a duration of the change in position of the micro-mirrors.

6. The electronic imager of claim 5, wherein the at least one portion of the light beam originating from said at least one light source is blocked or turned off throughout the duration of the change in position of the micro-mirrors.

7. The electronic imager of claim 5, wherein the at least one portion of the light beam originating from the at least one light source is blocked or turned off with a certain advance and/or a certain delay with respect to the change in position of the micro-mirrors.

8. The electronic imager of claim 5, comprising at least one electronic shutter arranged to block, when activated, the at least one portion of the light beam.

9. The electronic imager of claim 1, comprising an element for controlling the at least one light source, the element configured to turn off this source at least during one portion of a duration of the change in position of the micro-mirrors.

10. The electronic imager of claim 1, comprising a single matrix array of micro-mirrors and three light sources.

11. An assembly comprising a photographic medium and an electronic imager of claim 1.

12. A method for reproducing images on a photographic medium comprising projecting an image onto the photographic medium with an electronic imager of claim 1.

13. The method of claim 12, wherein the photographic medium comprises three superposed planes corresponding to red, green and blue levels, respectively, and wherein the electronic imager comprises a single matrix array of micro-mirrors and three light sources, with one light source for each respective plane of the medium.

14. The method of claim 13, wherein a light source corresponding to the plane of a desired color level is selected to illuminate the micro-mirrors of the matrix array during a change in their position.

15. A method for recording data using an electronic imager comprising at least one matrix array of micro-mirrors each of which is suitable for reflecting, during a change in position, a light beam originating from at least one light source toward a projecting optical element, the method comprising blocking at least one portion of the light beam originating from the at least one light source and/or turning off the at least one light source, at least during one portion of a duration of the change in position of the micro-mirrors, wherein the change in position of the micro-mirrors is commanded by a signal modulated at a switching frequency of the micro-mirrors that is lower than or equal to 1 kHz.

16. A method for modifying an electronic imager comprising at least one matrix array of micro-mirrors each of which is suitable for reflecting, during a change in position, a light beam originating from at least one light source toward a projecting optical element, the method comprising:
  reprogramming a controller of an imager that commands the change in position of the micro-mirrors at a reference frequency configured to subsequently be decreased; or
  replacing a controller of an imager that commands the change in position of the micro-mirrors at a reference frequency with an additional circuit that synthesizes at least one possible value of a switching frequency of the micro-mirrors, which value is lower than or equal to 1 kHz, the output of the additional circuit connected to an input that commands the change in position of the micro-mirrors.

* * * * *